(No Model.)
P. KETTENRING.
BAND SAW MACHINE.
No. 390,083. Patented Sept. 25, 1888.
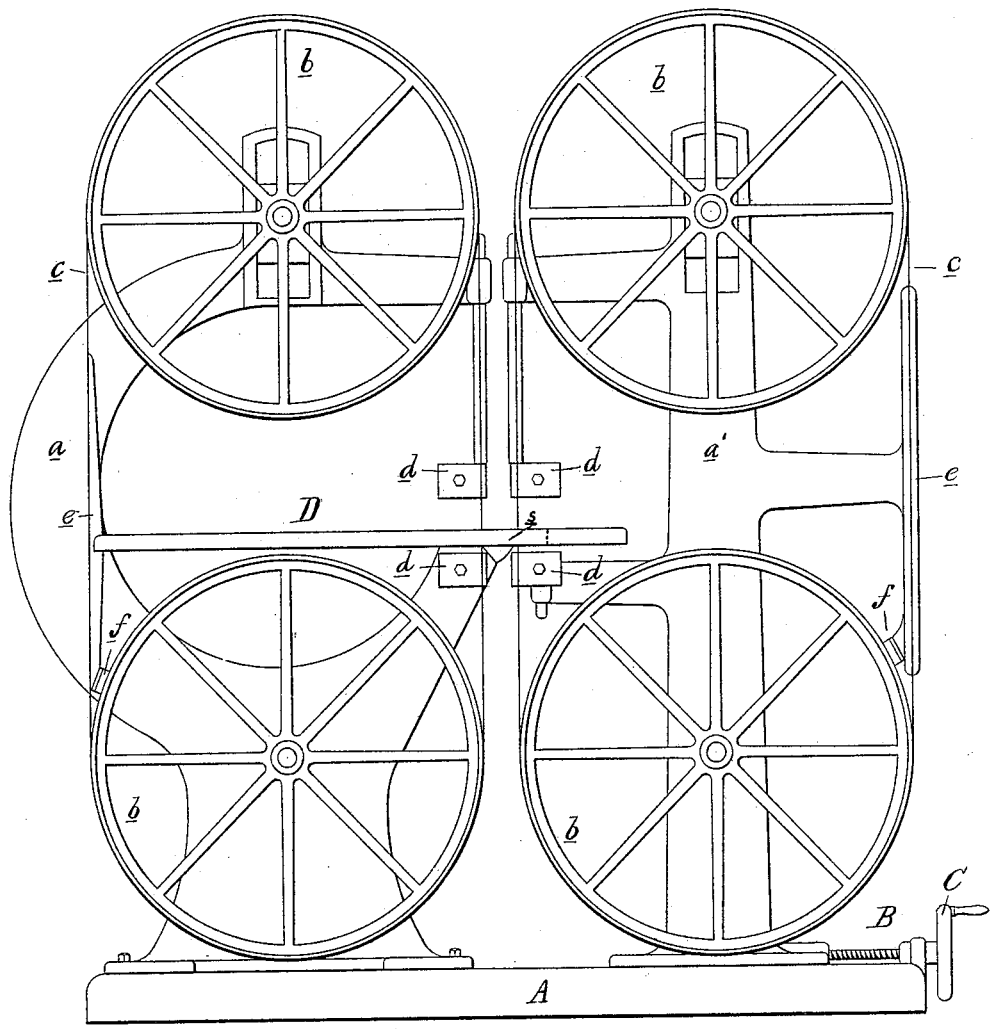
Witnesses:
P. M. Hulbert
John Schuman
Inventor:
Peter Kettenring
By Thos. S. Sprague & Son
Att'y.

United States Patent Office.

PETER KETTENRING, OF DEFIANCE, OHIO, ASSIGNOR TO THE DEFIANCE MACHINE WORKS, OF SAME PLACE.

BAND-SAW MACHINE.

SPECIFICATION forming part of Letters Patent No. 390,083, dated September 25, 1888.

Application filed April 20, 1888. Serial No. 271,334. (No model.)

*To all whom it may concern:*

Be it known that I, PETER KETTENRING, a citizen of the United States, residing at Defiance, in the county of Defiance and State of Ohio, have invented certain new and useful Improvements in Band-Saw Machines, of which the following is a specification, reference being had therein to the accompanying drawing.

This invention relates to certain new and useful improvements in band-saw machines, especially designed for shaping wood, such as wagon-fellies, chair-backs, and other work having parallel curved lines, or for straight work also, in which it would be an advantage to run two parallel cuts at the same time to facilitate the work.

To this end my invention consists in the peculiar arrangement and combination of parts, all as more fully hereinafter described.

In the drawing which accompanies this specification an elevation of my improved device is shown, illustrating two band saw devices complete in themselves, consisting of the frames $a$ $a'$, the wheels $b$, mounted thereon, the band-saws $c$, the saw-guides $d$, the guards $e$, the brushes $f$, all arranged and operating in the usual manner, except as hereinafter described. These two band-saw devices are mounted upon a common bed-plate, A, in such relation to each other as to bring the saw-blades parallel to each other, and with their cutting-edges in a common plane at right angles thereto. The standard $a'$ of one of the machines is laterally slidingly secured to the bed-plate A, and provided with suitable adjusting devices—such as the screw B and hand-wheel C—for increasing or diminishing the distance between the saw-blades.

D is a table common to both saws, and this is suitably slotted, as shown at $s$, to permit of adjusting the saws from or toward each other. The two band-saws may be driven from a common counter shaft, or either may be driven independently of the other.

The machine being arranged and constructed as shown and described, the work being fed to the saws, both saws will cut in a circular path, so as to cut out a wagon-felly or a chair-back from a straight blank at one operation and of any desired thickness to which the saws may be adjusted apart.

In feeding the work to the saw any means of guiding it to the desired pattern may be employed, either by marking the work and following the pattern by sight or by means of circular guides, in cutting fellies, or any other of the known styles of guides, depending upon the style of work to be done.

What I claim as my invention is—

The combination, in a device for the purpose described, of two band-saw machines mounted in adjustable relation to each other on a common bed-plate and provided with a saw-table common to both, said table being fixedly secured to the frame of one of said saws and slotted to provide for adjustment of the other saw, substantially as described.

In testimony whereof I affix my signature, in presence of two witnesses, this 5th day of April, 1888.

PETER KETTENRING.

Witnesses:
 JNO. P. CAMERON,
 PETER KUHN.